March 6, 1956     W. T. NELSON     2,737,538
2-PYRROLIDONE AS A SELECTIVE SOLVENT FOR AROMATIC HYDROCARBONS
Filed July 24, 1952
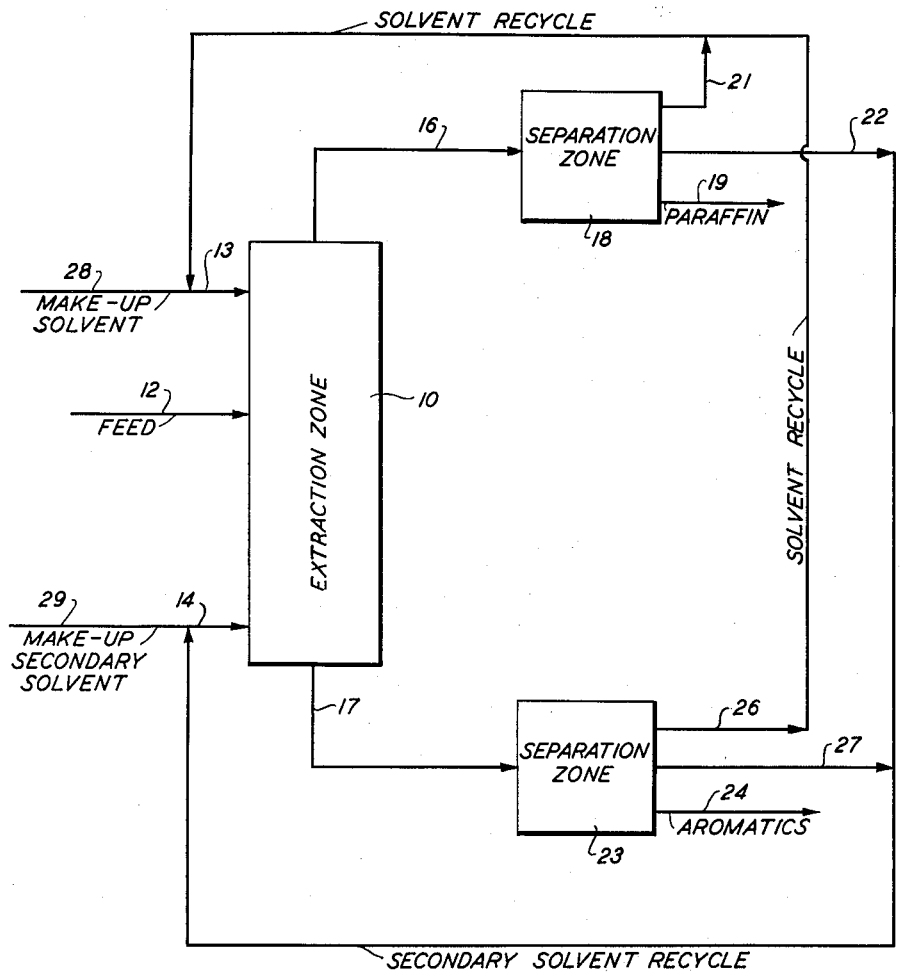
INVENTOR.
W. T. NELSON
BY
Hudson and Young
ATTORNEYS United States Patent Office 2,737,538
Patented Mar. 6, 1956

2,737,538

2-PYRROLIDONE AS A SELECTIVE SOLVENT FOR AROMATIC HYDROCARBONS

William T. Nelson, Bartlesville, Okla., assignor to Phillips Petroleum Company, a corporation of Delaware Application July 24, 1952, Serial No. 300,692

8 Claims. (Cl. 260—674)

This invention relates to a method for the separation and recovery of aromatic hydrocarbons from mixtures containing aromatic and paraffinic hydrocarbons. In a further aspect, this invention relates to a new selective solvent for solvent extraction and extractive distillation processes. In a further aspect, this invention relates to a method of separation of aromatic hydrocarbons from mixtures containing aromatic and paraffinic hydrocarbons comprising the use of 2-pyrrolidone as a selective solvent.

The use of selective solvents for the separation of organic compounds is well known in the art. Depending upon the characteristics of the extractive solvents and the organic compounds to be separated the process of solvent extraction or extractive distillation may be employed, the latter process usually requiring a more soluble solvent than the former. These processes are useful for obtaining separation of different components of mixtures which have such similar vapor pressures as to make their separation by conventional fractional distillation difficult if not impossible, or to separate compounds which form azeotropes with each other. This invention is directed particularly to the separation of hydrocarbon mixtures which are difficult to separate by conventional means by employing 2-pyrrolidone for the solvent extraction or extractive distillation of these fractions.

Solvent extraction operations are defined as those in which the separation of mixtures of different substances is accomplished by treatment with a selective liquid solvent. At least one of the components of the mixture must be immiscible or partly soluble with the treating solvent so that at least two phases are formed over the entire range of operating conditions used. In order for a separation to be effected, one or more of the components must be dissolved from the mixture by the solvent preferentially to the others.

By the various aspects of this invention one or more of the following objects will be obtained.

An object of this invention is to provide a method for the separation of aromatic hydrocarbons from mixtures containing aromatic and paraffinic hydrocarbons. A further object of this invention is to provide a new selective solvent for solvent extraction and extractive distillation processes for separating mixtures of aromatic and paraffinic hydrocarbons into their component parts. A further object of this invention comprises the use of 2-pyrrolidone as a selective solvent.

Other objects and advantages of this invention will be apparent to one skilled in the art upon studying this disclosure and the accompanying drawing which forms a part thereof.

I have found that 2-pyrrolidone is an excellent solvent for the separation of aromatic hydrocarbons from paraffinic hydrocarbons. 2-pyrrolidone has a boiling point of 245° C. and a melting point of 24.6° C. This solvent, the 2-pyrrolidone, is selective for aromatic hydrocarbons, including benzene, substituted benzene compounds, such as ethylbenzene, toluene, xylene, and the like, as well as the polynuclear aromatic hydrocarbons. The solvent rich phase containing the preferentially dissolved components, the aromatics, is called the extract layer, and the residual phase formed by the undissolved components, the paraffins, is the raffinate layer.

The accompanying drawing which is a part of this disclosure illustrates a preferred method of carrying out the separation of these compounds. This drawing illustrates the process normally known as dual solvent extraction. The use of the dual solvent system is preferable because of the fact that aromatics and the pyrrolidone solvent are miscible in all proportions at normal temperatures, and therefore relatively complete separation is not possible in the absence of a second solvent. In some instances, of course, where only concentration of the aromatics is desirable, the second solvent is not necessary. In the dual solvent process, the selective solvent is flowed through a packed tower or multi-stage treater countercurrently to an auxiliary or secondary solvent, such as a low-boiling liquid or liquefied paraffinic hydrocarbon, which is at least partially immiscible with the selective solvent in the presence of the mixture to be extracted. Normal pentane in the present process is particularly useful as an auxiliary or secondary solvent although other paraffinic hydrocarbons can be used.

In the drawing the extraction zone is designated by the numeral 10. This contacting column is provided with means for intimate contact between the feed stream and the solvent. For this purpose I prefer to use a column containing Raschig rings, bubble plates, Burl saddles and the like. This column is provided with feed inlet conduit 12, solvent inlet conduits 13 and 14, and outlet conduits 16 and 17. Conduit 16 extends into separation zone 18 from which a paraffin outlet conduit 19, and solvent recycle conduits 21 and 22 extend. Separation zone 23 is provided with aromatic removal conduit 24 and solvent recycle conduits 26 and 27. Communicating with solvent recycle conduits 13 and 14 are makeup solvent supply conduits 28 and 29.

In the operation of this process a hydrocarbon feed containing aromatic and paraffinic fractions is supplied to extraction zone 10 by means of conduit 12. 2-pyrrolidone is introduced into the upper portion of this zone through conduit 13 and a secondary solvent, such as normal pentane, is introduced into the lower portion of zone 10. The paraffinic fraction containing the paraffin solvent and a small proportion of the 2-pyrrolidone is taken overhead through conduit 16 to separation zone 18. This separation may be carried out in any suitable manner, and it is generally more feasible to separate the paraffin fraction of the feed from the solvents by means of distillation. The desired paraffin fraction is drawn off through conduit 19 and the respective solvents are returned to the extraction zone through conduits 21 and 22.

In like manner the aromatic fraction along with the 2-pyrrolidone and a small amount of the secondary solvent is removed from the lower portion of the extraction zone through conduit 17 and introduced into separation zone 23. This separation zone 23 is preferably similar to separation zone 18. From this last mentioned zone the aromatics are separated from the solvents and withdrawn through conduit 24 while conduits 26 and 27 return the solvents to the extraction zone. As needed, makeup solvents are supplied through conduits 28 and 29.

Although I have illustrated a solvent extraction process, it will be evident that 2-pyrrolidone may also be used in an extractive distillation process.

In order to illustrate my invention 50 volume per cent of a mixture containing 50 per cent benzene and 50 per cent normal heptane was agitated about two minutes with 50 volume per cent of 2-pyrrolidone at 22° C. and allowed to settle several minutes. The extract was drawn off. The results are shown in the following table.

|  | Volume, Percent | | | | |
| --- | --- | --- | --- | --- | --- |
|  | Charge | Extract | Raffinate | K | $K_R$ |
| Percent of Charge | 100.0 | 73.5 | 26.5 |  |  |
| Solvent 2-pyrrolidone | 50.0 | 67.3 | 1.9 |  |  |
| Benzene | 25.0 | 24.1 | 21.9 | 1.10 | 9.7 |
| n-heptane | 25.0 | 8.6 | 76.2 | 0.113 | 1.00 |

Temperature 22° C.

where $$K = \text{partition coefficient} = \frac{\text{concentration in extract}}{\text{concentration in raffinate}}$$

and $K_R$ = partition coefficient relative to normal heptane

The following table illustrates binary cloud point data for a mixture of 50 volume per cent 2-pyrrolidone and 50 volume per cent of various hydrocarbons.

| Solvent | Hydrocarbon | Cloud Point, °F. |
| --- | --- | --- |
| 2-pyrrolidone | Benzene | 33–37 (freezes). |
| Do | Toluene | 35–40 (freezes). |
| Do | isopentane | >215. |
| Do | diisopropyl | >215. |
| Do | n-hexane | >215. |
| Do | cyclohexane | >215. |
| Do | n-heptane | >215. |
| Do | 2-heptene | >215. |

Cloud points at 50–50 volume concentration generally correspond with the critical solution temperature and it will be seen from an examination of this table that the aromatics are quite far removed from the paraffinic hydrocarbons. This makes possible a sharp separation.

Temperatures useful in the practice of my invention are dependent upon the particular components in the mixture to be separated. The lower temperature limit is the temperature at which freezing first occurs and the upper temperature limit is the cloud point of the less soluble component, preferably the cloud point of the more soluble component.

As many possible embodiments may be made of this invention without departing from the scope thereof, it is to be understood that all matter herein set forth or shown in the accompanying drawing is to be interpreted as illustrative and not in a limiting sense.

I claim:

1. In the separation and recovery of aromatic hydrocarbons from a mixture of hydrocarbons including aromatic and paraffinic hydrocarbons, the step of treating said mixture with 2-pyrrolidone as a selective solvent.

2. The separation of claim 1 wherein said separation is carried out in a solvent extraction process.

3. The separation of claim 1 wherein said separation is carried out in an extractive distillation process.

4. In the separation and recovery of compounds selected from the group consisting of benzene, ethylbenzene, toluene and xylene from mixtures of said compounds with paraffinic hydrocarbons comprising treating said mixture with 2-pyrrolidone as a selective solvent.

5. In the separation and recovery of benzene from a mixture of benzene and normal heptane, the step of treating said mixture with 2-pyrrolidone as a selective solvent.

6. In the separation and recovery of an aromatic fraction and a paraffinic fraction from a mixture containing aromatic and paraffinic hydrocarbons, the step of treating said mixture with a dual solvent comprising 2-pyrrolidone and a paraffin hydrocarbon having a boiling point such that it may be separated from the desired paraffin by ordinary fractionation.

7. The separation of claim 6 in which said paraffin hydrocarbon solvent is normal pentane.

8. A solvent extraction process comprising introducing a feed stream containing aromatic and paraffinic hydrocarbons into the central portion of a contacting zone; introducing a first solvent consisting essentially of 2-pyrrolidone into the upper end portion of said zone; introducing a second solvent into the lower end portion of said zone; passing a paraffin rich fraction from the upper end portion of said zone to a first separation zone; removing a paraffin stream from said zone; passing an aromatic hydrocarbon rich stream from the lower end portion of said contacting zone to a second separation zone; removing an aromatic hydrocarbon stream from said second separation zone; recovering and recycling said first and second solvents from said separation zones to said contacting zones.

References Cited in the file of this patent

UNITED STATES PATENTS

| 2,092,739 | Van Dijck | Sept. 7, 1937 |
| 2,149,322 | Tuttle | Mar. 7, 1939 |
| 2,407,997 | Patterson | Sept. 24, 1946 |
| 2,409,059 | Montgomery et al. | Oct. 8, 1946 |
| 2,444,582 | Smith | July 6, 1948 |

FOREIGN PATENTS

| 441,104 | Great Britain | Jan. 13, 1936 |
| 472,767 | Great Britain | Sept. 30, 1937 |

OTHER REFERENCES

Chemical Abstracts, vol. 28, page 744 (1934), original article in Gazz. Chim. Ital., vol. 63, page 495 (1933).